(Model.)
S. J. FLATOW.
CURING TOBACCO.
No. 264,523. Patented Sept. 19, 1882.
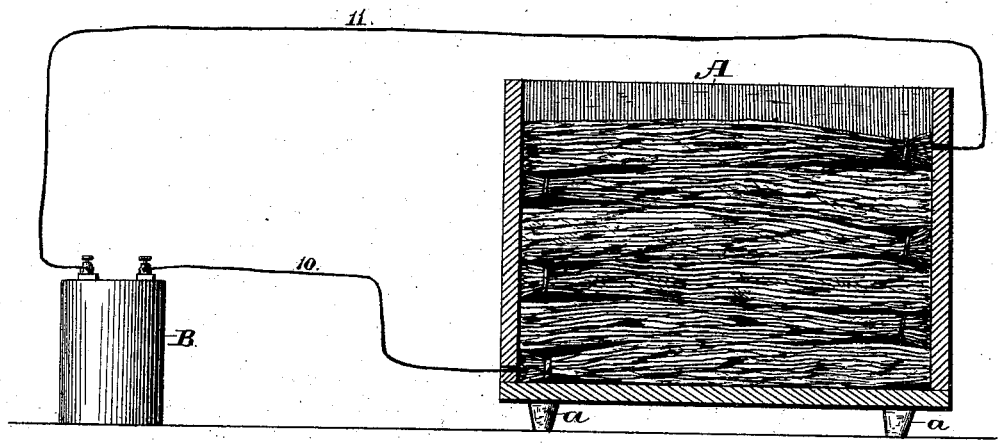
Attest:
J. Henry Kaiser.
James M. Wright
Inventor.
Simon J Flatow.
By
Van Santvoord & Hauff.
Atty.

UNITED STATES PATENT OFFICE.

SIMON J. FLATOW, OF NEW ORLEANS, LOUISIANA, ASSIGNOR OF ONE-EIGHTH TO RICHARD LLOREUS, OF NEW YORK, N. Y.

CURING TOBACCO.

SPECIFICATION forming part of Letters Patent No. 264,523, dated September 19, 1882.

Application filed February 24, 1880. Renewed May 29, 1882. (Model.)

*To all whom it may concern:*

Be it known that I, SIMON J. FLATOW, of New Orleans, in the parish of Orleans and State of Louisiana, have invented certain new and useful Improvements in Curing Tobacco, of which the following is a specification.

My invention consists in a new and improved process for curing tobacco by moistening the tobacco-leaves with water and then exposing the moistened leaves to the action of a current of electricity.

The accompanying drawing illustrates an apparatus which may be used in carrying out my invention.

In this drawing, the letter A designates a box of wood or any other suitable material, by preference of some material which is a bad conductor of electricity, and if desired said box may be provided with feet $a$ of glass or other insulating material to prevent loss of electricity as much as possible.

The tobacco-leaves to be cured are formed into bundles as usual, and after these bundles have been soaked in water so that the leaves become thoroughly moistened I place the same in the box A and expose them to a current of electricity. Any source of electricity may be used for this purpose—such, for instance, as a magneto-electric machine or a galvanic battery. In the example illustrated by the drawing I have shown a battery, B, one pole of which connects with the lowest bundle of tobacco-leaves by a wire, 10, while the uppermost bundle of leaves connects with the other pole of a battery by a wire, 11. As soon as the connection is made a current of electricity passes through the moistened tobacco-leaves, and by the action of electricity the water contained in the leaves is decomposed and rapidly driven off; and, furthermore, the gases resulting from the decomposition of the water materially assist in curing the tobacco.

By my process the operation of curing tobacco can be effected with comparatively little labor, and the color and quality of the tobacco is materially improved.

What I claim is—

The within-described process of curing tobacco, the same consisting in moistening the tobacco-leaves, packing the same in a suitable pile, and then exposing the same to the action of a current of electricity, substantially as set forth.

In testimony whereof I have hereunto signed my name.

SIMON J. FLATOW.

In presence of—
R. DORCUS,
MAX FLATOW.